(12) United States Patent
Yamane et al.

(10) Patent No.: US 6,881,436 B2
(45) Date of Patent: Apr. 19, 2005

(54) METHOD FOR RECYCLING AQUEOUS PAINT

(75) Inventors: Tsuyoshi Yamane, Osaka-fu (JP);
Junichi Sueyoshi, Kyoto-fu (JP);
Takahito Ohtsu, Osaka-fu (JP)

(73) Assignee: Nippon Paint Co., Ltd., Osaka-fu (JP)

( * ) Notice: Subject to any disclaimer, the term of this patent is extended or adjusted under 35 U.S.C. 154(b) by 203 days.

(21) Appl. No.: 09/941,693

(22) Filed: Aug. 30, 2001

(65) Prior Publication Data

US 2002/0028299 A1 Mar. 7, 2002

(30) Foreign Application Priority Data

Sep. 4, 2000 (JP) ........................................ 2000/267340

(51) Int. Cl.[7] .......................... B05D 1/02; B01D 37/00
(52) U.S. Cl. .......................... 427/8; 427/345; 427/421; 118/602; 118/603; 118/326; 118/501; 210/650; 210/195.1; 210/252; 210/259; 210/295
(58) Field of Search ................................ 427/345, 421, 427/8; 118/602, 603, 610, 300, 501, 326; 210/650, 195.1, 252, 259, 295

(56) References Cited

U.S. PATENT DOCUMENTS

| | | | | |
|---|---|---|---|---|
| 4,607,592 A | | 8/1986 | Richter ........................ 118/689 |
| 5,393,390 A | * | 2/1995 | Freese et al. ................ 210/650 |
| 5,443,738 A | | 8/1995 | Bhatnagar et al. .......... 210/641 |
| 5,453,301 A | * | 9/1995 | Saatweber et al. .......... 427/421 |
| 5,490,939 A | * | 2/1996 | Gerigk et al. ................ 210/652 |
| 5,569,384 A | * | 10/1996 | Saatweber et al. .......... 210/651 |
| 6,251,483 B1 | * | 6/2001 | Watanabe et al. ........... 427/345 |
| 2002/0000191 A1 | * | 1/2002 | Yamane ....................... 118/326 |

FOREIGN PATENT DOCUMENTS

| | | |
|---|---|---|
| DE | 2 255 914 | 5/1974 |
| DE | 34 28 300 | 2/1986 |
| EP | 0 567 915 | 11/1993 |
| EP | 0 878 494 | 11/1998 |
| EP | 0 901 988 | 3/1999 |

* cited by examiner

Primary Examiner—Kirsten Jolley
(74) Attorney, Agent, or Firm—Wenderoth, Lind & Ponack, L.L.P.

(57) ABSTRACT

Material balance is maintained in a recycling system for aqueous paint by controlling a liquid amount within the recycling system while spray-coating an article. A recycling method includes: coating an article with aqueous paint in a water-curtain-type coating booth; collecting an over-spray paint, that does not adhere to the article, by virtue of a water curtain; sending a collected solution of paint and water to a condensation bath through a booth circulation water bath; separating this solution by an ultra-filtration apparatus into condensed paint and filtrate, with the condensed paint being transferred to a paint tank; and removing condensed paint from the paint tank, if necessary for adjustment of aqueous paint, followed by coating this aqueous paint onto an article, wherein a total amount of liquid present within the recycling system is controlled to be constant during spray-coating of an article.

8 Claims, 4 Drawing Sheets

METHOD FOR RECYCLING AQUEOUS PAINT

FIELD OF THE INVENTION

The present invention relates to a method for controlling a recycling system for aqueous paint in order to stably repeat a cycle in which aqueous paint is coated onto an article, collected and re-used.

BACKGROUND OF THE INVENTION

Aqueous paint has widely been used for coating industrial products. Aqueous paint is especially noted from a point of re-use without paint waste, because over-sprayed paint, i.e. aqueous paint that does not adhere to an article during coating thereof, is collected with water, filtered and condensed, and then re-used as paint. Aqueous paint also tends to be more widely used because a filtrate of the paint is water, and because the paint is easily handled without any problem, such as air pollution, in comparison with a paint using an organic solvent.

A recycling system for aqueous paint currently used is proposed in, for example, Japanese Kokai Publication Hei 5 (1993)-228422, of which a schematic view is shown in FIG. 4. In FIG. 4, when an article 250 is coated with aqueous paint 220 sprayed from a coating-gun 202 in a spray coating room 201, an over-sprayed paint 204 that does not adhere to the article is collected by water-curtain 203 formed from aqueous rinsing liquid. Liquid containing this collected paint is partially sent to an ultra-filtration apparatus 208 through a pre-filter 207 to separate the liquid into filtrate 213 and condensed paint 214. The filtrate 213 is used again as an aqueous rinsing liquid. The condensed paint 214 is subjected to condensation several times by the ultra-filtration apparatus 208. A small portion of the condensed paint 214 is sampled and subjected to compositional analysis so as to obtain by calculation an amount of each component to be supplied for forming recycled paint, so that a supplemental paint 209 is separately formed. The condensed paint 214 is then mixed with the supplemental paint 209 in a supplemental apparatus 210 to form an aqueous paint 211 for recycle use, which is spray coated onto another article.

After a certain period of operation of the above-mentioned recycling system, aqueous paint that has not been coated onto articles during a coating operation, and that spreads out to adhere onto a wall surface of the coating booth, is eventually dried and solidified so as to become floating matter or an impurity. In order to remove this floating matter or impurity from the recycling system, the coating booth is cleaned with water or booth circulating water 206 when a coating operation is stopped. This cleaning, in turn, significantly increases an amount of the booth circulating water 206 and results in extending a period of time for subsequent separation and condensation steps. If an amount of the booth circulating water 206 is too small, the floating matter or impurity is insufficiently removed and causes plugging of the pre-filter 207 and the ultra-filtration apparatus 208.

In the above mentioned Japanese Kokai Publication Hei 5 (1993)-228422, preparation of supplemental paint 209 supplements removed components such as floating matter or an impurity and supplies water and low molecular weight volatile materials. Preparation of the supplemental paint 209 is conducted by a compositional analysis of condensed paint 214, and a calculation of supplementing an amount of each component from a result of this analysis. Supplementing amounts obtained by the analysis does not make effective use of sources of paint, and it takes a relatively long time for preparing a recycled paint. In addition, this method does not control a liquid amount of a cleaning liquid and paint, and therefore, does not maintain material balance throughout the system.

OBJECT OF THE INVENTION

The present invention is to provide a recycling method for aqueous paint, wherein material balance is maintained by integrally controlling a liquid amount within a recycling system during spray-coating of an article.

The present invention also provides a recycling method for aqueous paint, which is simply conducted without compositional analysis or calculation of supplemental amounts of components from condensed paint that has been collected in a recycling system. Accordingly, the present invention provides a recycling method that can easily obtain a recycled paint having a constant paint composition without performing a compositional analysis.

SUMMARY OF THE INVENTION

The present inventors have found that the above-mentioned problems have been overcome by maintaing material balance by way of controlling volume of each liquid derived from aqueous paint and booth circulation water moving within a recycling system.

That is, the present invention provides within a recycling system for aqueous paint, a method comprising:

coating an article with an aqueous paint in a water-curtain-type coating booth, collecting an over-spray paint that does not adhere to the article by virtue of a water-curtain, sending this collected solution of paint and water to a condensation bath through a booth circulation water bath, separating this solution, by an ultra-filtration apparatus, into condensed paint and filtrate, with the condensed paint being transferred to a paint tank, and removing condensed paint from the paint tank if necessary for adjustment, followed by coating this paint, as an aqueous paint, onto an article, wherein a total amount of liquid present within the recycling system is controlled to be constant during spray-coating of an article with aqueous paint.

In the recycling system of the present invention, the term "liquid amount" means a volume amount of liquid present in the recycling system, for example volume amount of booth circulation water, volume amount of filtrate, volume amount of collected liquid in a condensation bath and volume amount of condensed paint in a paint tank, and the like, as well as volume amount of liquid present in pipe lines in the system.

In the present invention, a total amount of liquid present within the recycling system should be controlled to be constant during spray-coating of an article. This is achieved by a total of a volume (Vw) of booth circulation water, a volume (Vx) of filtrate, a volume (Vy) of a collected solution in a condensation bath, and a volume (Vz) of condensed paint in a paint tank, that is (Vw+Vx+Vy+Vz), being maintained constant. In addition, in a case where the system further comprises a settling tank for storing booth circulation water and a rinse tank for storing filtrate removed from a filtrate bath, the present invention can also be achieved by a total of a volume (Vw) of booth circulation water, a volume (Vx) of filtrate, a volume (Vy) of collected solution in a condensation bath, a volume (Vz) of condensed paint in a paint tank, a volume (Vs) of booth circulation water in the settling tank and a volume (Vt) of filtrate in the rinse tank, that is (Vw+Vx+Vy+Vz+Vs+Vt), being maintained constant.

DETAILED DESCRIPTION OF THE PREFERRED EMBODIMENTS

Figure 1:
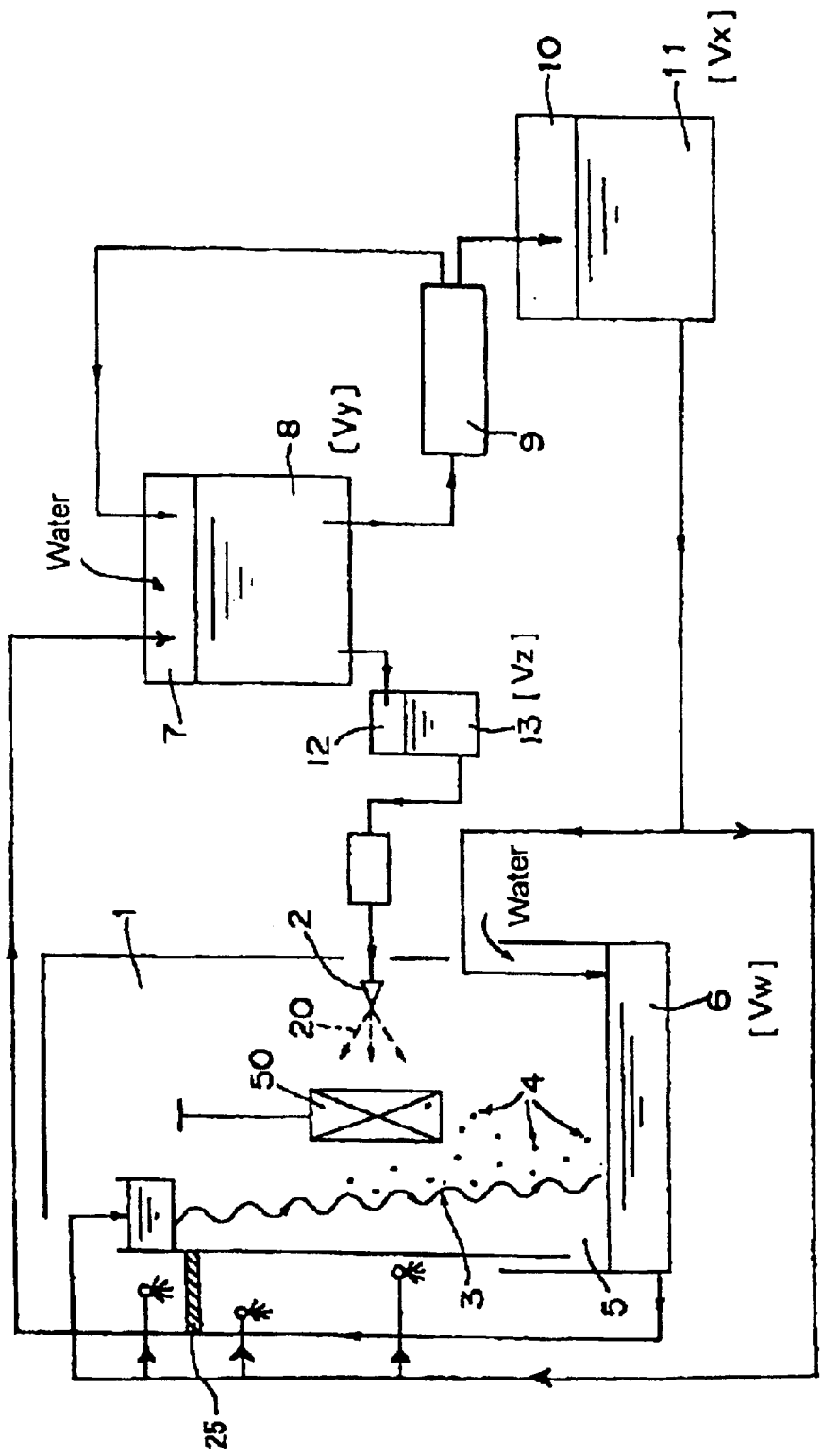
FIG. 1 is a schematic view that shows one example of a recycling system for aqueous paint according to the present invention.

In a recycling system of the present invention as shown in FIG. 1, an aqueous paint 20 is spray-coated onto an article 50 by a coating gun 2 in a water-curtain-type coating booth 1, and an over-spray paint 4 that has not adhered to the article 50 is collected by water curtain 3, which contains a booth circulation water 6. This collected paint is sent to a condensation bath 7 as a collected liquid 8 through a booth circulation bath 5.

The collected liquid 8 is optionally sent to an ultra-filtration apparatus 9 to separate from the liquid filtrate 11, and remaining liquid is returned to the condensation bath 7 and repeatedly subjected to condensation by the ultra-filtration apparatus 9 to condense the liquid so as to form condensed paint 13. The condensed paint 13 is transferred to a paint tank 12 and stored therein.

The filtrate 11, having been separated, is stored in a filtrate bath 10. The condensed paint 13 stored in the paint tank 12 is suitably adjusted to form an aqueous paint for coating an article, which paint is spray-coated again in the water-curtain-type coating booth.

Figure 2:
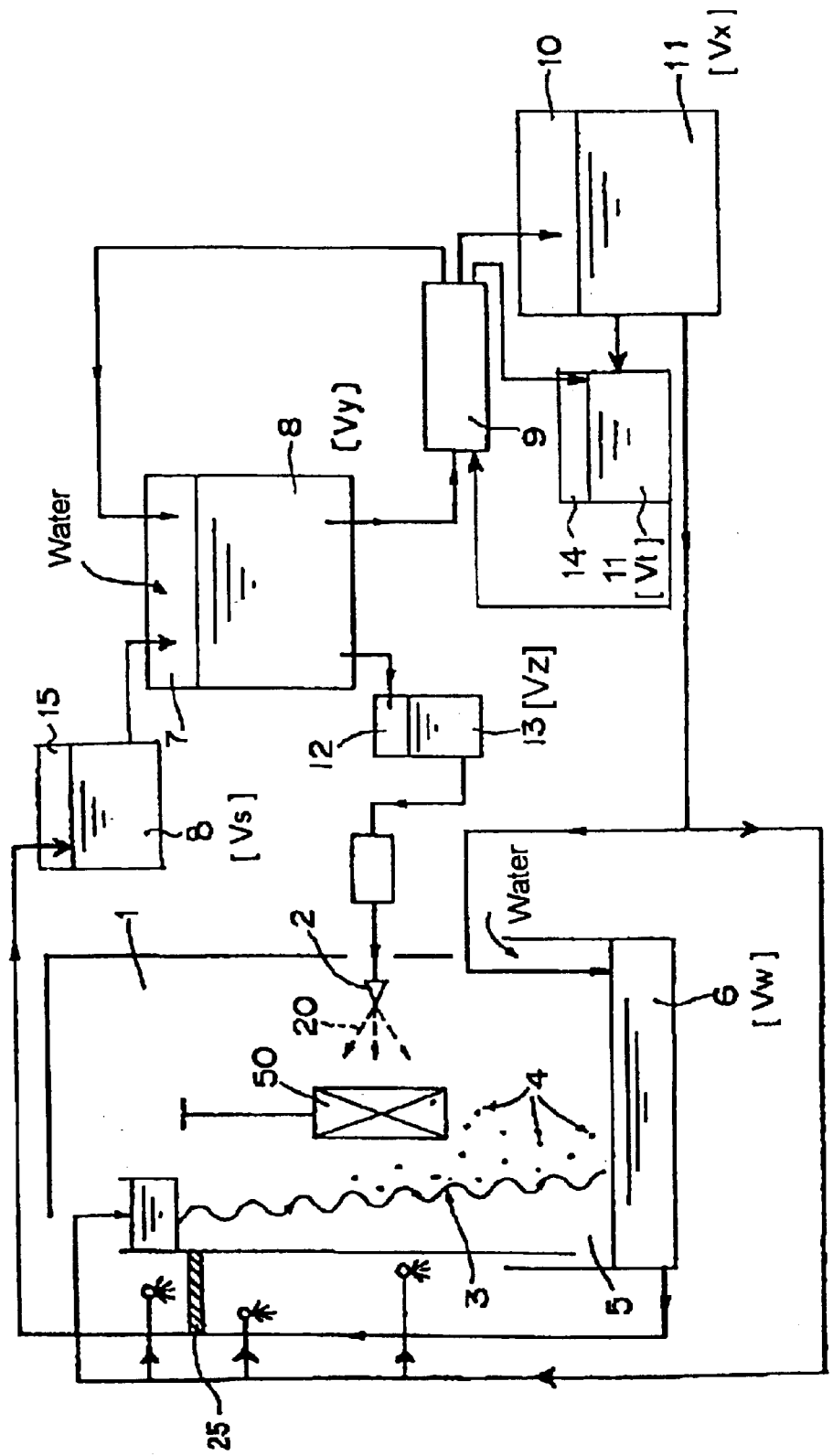
FIG. 2 is a schematic view that shows another example of the recycling system for aqueous paint according to the present invention.

In another example of the recycling system of the present invention as shown in FIG. 2, a settling tank 15 for storing collected liquid 8 or booth circulation water 6 is present between condensation bath 7 and booth circulation bath 5. In addition, a rinse tank 14, for storing a portion of filtrate 11 to rinse ultra-filtration apparatus 9, is attached to the ultra-filtration apparatus 9 and also connected to filtrate bath 10.

According to the present invention, material balance of liquid in the recycling system should be maintained constant during a coating operation. That is, a total volume of liquid present in the recycling system as shown in FIG. 1 is maintained constant during a coating operation. This is achieved by having a total of a volume (Vw) of the booth circulation water, a volume (Vx) of the filtrate, a volume (Vy) of the collected solution in the condensation bath, and a volume (Vz) of the condensed paint in the paint tank, that is (Vw+Vx+Vy+Vz), maintained constant. In addition, in a case where the system further comprises a settling tank for storing booth circulation water, and a rinse tank for storing filtrate removed from the filtrate bath as shown in FIG. 2, the present invention can also be achieved by having a total of a volume (Vw) of booth circulation water not in the settling tank, a volume (Vx) of filtrate not in the rinse tank, a volume (Vy) of the collected solution in the condensation bath, a volume (Vz) of the condensed paint in the paint tank, a volume (Vs) of the booth circulation water in the settling tank and a volume (Vt) of the filtrate in the rinse tank, that is (Vw+Vx+Vy+Vz+Vs+Vt), maintained constant.

A few preferred embodiments are hereinafter explained.

Embodiment 1

In one embodiment of the present invention, when spray-coating is stopped after operating the system for a certain period of time, a portion of filtrate 11 is sent to coating booth 1 from filtrate bath 10 to clean an interior of the coating booth I. After cleaning the coating booth 1, booth circulation water 6 in booth circulation bath 5 is sent to condensation bath 7 and then spray-coating will re-start. When the portion of the filtrate 11 is sent to the coating booth 1, it may be sent to either the booth circulation bath 5 or a booth cleaning pipe. When cleaning the coating booth 1, all walls inside the coating booth 1 are cleaned, in addition to usual cleaning with water curtain 3.

In Embodiment 1, a total of a volume (Vw) of the booth circulation water 6 in booth circulation bath 5, a volume (Vx) of the filtrate 11 in the filtrate bath 10, a volume (Vy) of collected solution 8 in the condensation bath 7, and a volume (Vz) of condensed paint 13 in paint tank 12, that is (Vw+Vx+Vy+Vz), is maintained constant. In a case of the second example of FIG. 2, liquid volume (Vs) of the settling tank 15 and liquid volume (Vt) of the rinse tank 14 should be added to the above total.

Figure 3:
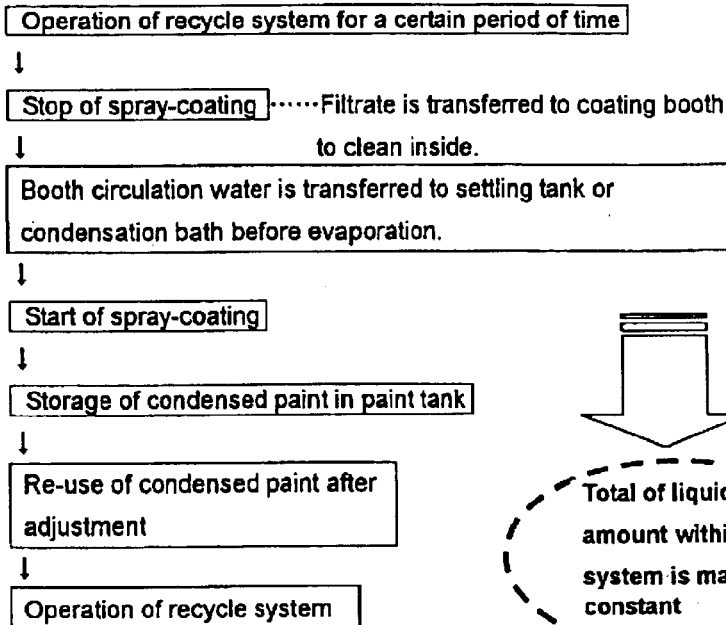
FIG. 3 is a flow chart showing a controlling operation for the recycling system of the present invention.
Figure 3:
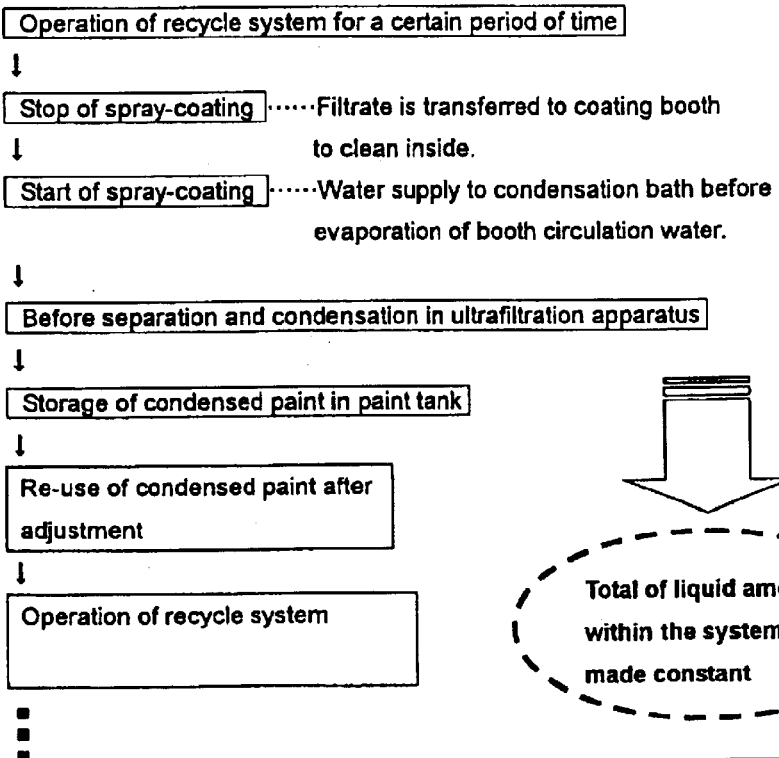
Figure 4:
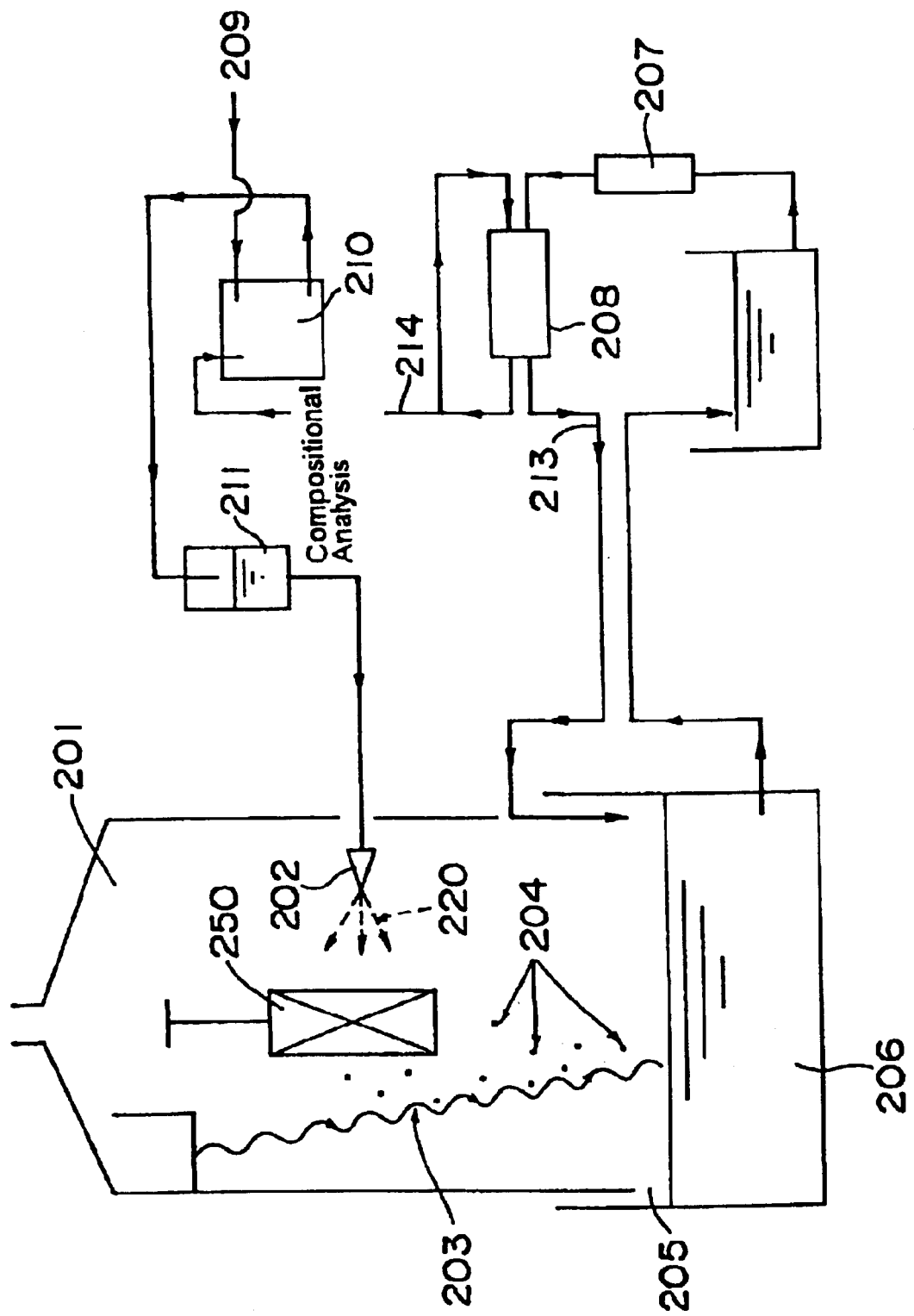
FIG. 4 is a schematic view that shows a conventional recycling system for aqueous paint.

In FIG. 3, a flow chart is described. For example, aqueous paint 20 has a solid content of 30 to 60% by weight and is spray-coated onto an article during a certain period of time. When stopping this spray-coating, a certain amount of filtrate 11 is sent to the coating booth 1. Booth circulation water 6 increases in an amount eqaul to the amount of filtrate 11 sent to the coating booth, and is employed for water curtain 3 to clean an interior of coating booth 1, and then sent to condensation bath 7, followed by re-starting a spray-coating operation within the coating booth 1.

After re-starting the spray coating operation, and before or during generating a small amount of evaporated booth circulation water 6 in booth circulation bath 5, the booth circulation water 6 is sent to the condensation bath 7 in an amount equal to the amount of the filtrate sent to the coating booth 1. Then, in order to compensate for loss of the filtrate 11, collected liquid 8 in the condensation bath 7 is sent to ultra-filtration apparatus 9 to condense the collected liquid 8 to a non-volatile content of about 0.5 to 30% by weight, and to generate a certain amount of filtrate. The collected liquid is further subjected to condensation to obtain condensed paint 13 with a solid content of 25 to 60% by weight. The condensed paint 13 is transferred to paint tank 12 for storage. The filtrate 11 is stored in filtrate bath 10, but a portion thereof is sent to rinse tank 14 for storage and is to be used for rinsing of the ultra-filtration apparatus 9.

Condensed paint is optionally removed from paint tank 12 and adjusted for re-use.

Embodiment 2

In a second embodiment of the present invention, when the recycling system is operated for a certain period of time and then spray-coating of an article is stopped, a certain amount of filtrate is sent from filtrate bath 10 to booth circulation bath 5 to clean an interior of coating booth 1, followed by re-starting of a spray-coating operation. Thereafter, water is supplied to the recycling system in an amount equal to an amount of booth circulation water 6 lost by vaporization or the like, during a coating operation, to control a liquid amount of the system. In other words, the second embodiment is one wherein loss of liquid within the system by performing a coating operation is compensated for by externally supplying water into the system so as to make a liquid amount constant.

In Embodiment 2, after a certain amount of filtrate 11 is sent from the filtrate bath 10 to the booth circulation bath 5, similar to Embodiment 1, spray-coating starts again. At this point, the booth circulation water 6 in the booth circulation bath 5 is increased by an amount equal to an amount of the filtrate sent from the filtrate bath 10 to the booth circulation bath 5, but a total amount of liquid is unchanged.

However, water or other solvents are evaporated from the system to reduce an amount of water in the system, when operating the system (such as spray coating with water curtain 3 of the booth circulation water 6). If the collected liquid is sent to ultra-filtration apparatus 9 to separate and condense this liquid without supplementing liquid, similar to Embodiment 1, both a resulting condensed paint and filtrate are changed in composition. In other words, evaporation of water results in reduction of a total amount of liquid, and therefore, a content of each component increases in relation thereto, thus resulting in condensed paint becoming outside of a controlled range.

Accordingly, in Embodiment 2, water is supplied in an amount equal to an amount of liquid lost by evaporation, and the like, into condensation bath 7 before separating and condensing collected liquid 8 in the ultra-filtration apparatus 9. This results in material balance being constant and also maintains constant a compositional amount of obtained condensed paint and filtrate. After supplying water to condensation bath 7, collected liquid 8 is separated and condensed in ultra-filtration apparatus 9 to obtain condensed paint 13, which is optionally adjusted for re-use as aqueous paint.

For example, aqueous paint 20 has a solid content of 30 to 60 by weight and is spray-coated for a certain period of time. When stopping this spray-coating operation, a certain amount of filtrate 11 is sent to booth circulation bath 5. Booth circulation water 6 increases in an amount equal to an amount of filtrate 11 sent to the booth circulation bath, and is employed for water curtain 3 to clean an interior of coating booth 1, followed by re-starting a spray-coating operation in the booth 1.

After re-starting the spray-coating operation, and before separating and condensing collected liquid 8, water is added into condensation bath 7 to control a total amount of (Vw+Vx+Vy+Vz+Vs+Vt) to be constant, in case a total amount of liquid in the system is less than a certain level. Then, separation and condensation are conducted in ultra-filtration apparatus 9. Thereafter, the collected liquid 8 in the condensation bath 7 is sent to the ultra-filtration apparatus 9 to condense the collected liquid 8 into a non-volatile content of about 40 to 60% by weight and to generate a certain amount of filtrate. Condensened paint 13 is transferred to paint tank 12 for storage. Filtrate 11 is stored in filtrate bath 10, but a portion of it is sent to the rinse tank 14 for storage and is to be used for rinsing of the ultra-filtration apparatus 9.

According to the present invention, a total liquid volume is maintained constant, so that water is supplied within the system for compensating loss of liquid from the system, resulting from vaporizing or being carried out with applied paint. Supply of water may be conducted at any portion within the system, but water is generally supplied to the booth circulation water when re-starting a coating operation. In addition to, or as an alternative to supplying water to the booth circulation water, water may be supplied at a portion of condensation bath 7 before separating collected liquid 8 in the ultra-filtration apparatus 9, as explained in Embodiment 2.

Water supply into the booth circulation water 6 can be conducted by using a water level sensor provided within the booth circulation bath 5, and a water supply apparatus operated in conjuction with an output of the water level sensor. For example, when re-starting a coating operation, a water level (liquid level) is lowered by evaporation of water or carrying out of water upon coating of articles, and use of the water level sensor and the water supply apparatus results in the water level being retrieved. As a result, material balance within the system is maintained constant by water supply.

Supply of water into the booth circulation water 6 not only inhibits significant loss of an amount of the booth circulation water 6 in the booth circulation bath 5, but also ensures a sufficient water amount for water curtain 3. This inhibits generation of floating materials or impurities in the booth circulation water 6 and shortens a period of time for separating and condensing collected liquid 8 in ultra-filtration apparatus 9, which enhances a recycle efficiency of the system.

According to the present invention, condensed paint 13 is adjusted with either a new aqueous paint or a liquid mixture of volatile components contained in aqueous paint, or both, to form recycled aqueous paint. The aqueous paint used in the present invention generally comprises non-volatile components (such as a binder resin, pigment, additives and the like), a small amount of volatile components (such as a solvent other than water, auxiliary components (e.g. a surfactant) and the like) and water.

In the prior art method, condensed paint is subjected to compositional analysis, and necessary compositional amounts are calculated therefrom for adjusting recycled paint. This method generally takes a quite long time and is ineffective. In the present invention, however, it is very simple that water is added and non-volatile components are supplemented in the form of a paint composition to form recycled aqueous paint. This is because condensed paint formed by ultra-filtration contains necessary components in quite sufficient amounts, and if water occupying a large amount of aqueous paint is added thereto, there may be no need of adjustment of small amounts of volatile components.

In the present invention, time-consuming adjustment of the prior art technique is not necessary. Instead, water or new paint is added to condensed paint without any calculation of composition, in simple notice of a total liquid amount in the system, to result in obtaining recycled aqueous paint.

Equipment and devices employed in the recycling system of the present invention (e.g. water-curtain-type coating booth 1, spray gun 2, booth circulation bath 5, filtrate bath 10, paint tank 12, ultra-filtration apparatus 9 and the like) are not limited and can be those that have been used in conventional aqueous paint coating systems.

In the present invention, water is used for the system and aqueous paint. The water is generally ion-exchanged water, or purified water for preventing immixture of foreign matter into the system.

According to the present invention, a material balance within the recycling system is controlled by a simple method wherein a liquid amount in the system is merely monitored and loss of a liquid amount is supplied mainly with water that is sometimes admixed with aqueous paint or other organic solvents. This method makes control of the system easy and does not always necessitate a compositional analysis, which has been used for adjusting condensed paint to recycled usable aqueous paint.

What is claimed is:

1. A method of recycling aqueous paint, comprising:
in a recycling system having
(i) a coating booth,
(ii) a booth circulation water bath,
(iii) a condensation bath,
(iv) an ultra-filtration apparatus,
(v) a paint tank,
(vi) a setting tank, and
(vii) a rinse tank,
spray-coating an article with aqueous paint in said coating booth;
using a water curtain in said coating booth to collect over-spray paint that does not adhere to said article;
passing said over-spray paint and water of said water curtain into said booth circulation water bath so as to convey a mixture of said over-spray paint and water into said condensation bath;
using said ultra-filtration apparatus to separate said mixture into condensed paint and filtrate;
conveying said condensed paint into said paint tank;
if necessary, removing said condensed paint from said paint tank for adjustment thereof and using this adjusted condensed paint for aqueous paint to coat an article;
storing booth circulation water in said settling tank;
storing a portion of said filtrate in said rinse tank;
conveying said portion of said filtrate from said rinse tank into said ultra-filtration apparatus so as to rinse said ultra-filtration apparatus; and
controlling to be constant during the spray-coating of said article with said aqueous paint, a sum of $Vw+Vx+Vy+Vz+Vs+Vt$,
with $Vw$ being equal to a volume of water in said booth circulation water bath, $Vx$ being equal to a volume of said filtrate not in said rinse tank, $Vy$ being equal to a volume of said mixture of said over-spray paint and water that is within said condensation bath, $Vz$ being equal to a volume of said condensed paint in said paint tank, $Vs$ being equal to said booth circulation water in said settling tank and $Vt$ being equal to a volume of said portion of said filtrate in said rinse tank.

2. The method according to claim 1, wherein said recycling system further has a filtrate bath, and further comprising:
storing said filtrate in said filtrate bath;
when spray-coating of an article is not being performed, conveying a necessary amount of said filtrate from said filtrate bath into said coating booth so as to clean an interior of said coating booth; then
conveying water from said coating booth to said condensation bath; and then
performing a spray-coating operation in said coating booth.

3. The method according to claim 2, wherein
conveying water from said coating booth to said condensation bath comprises, prior to evaporation of water from said booth circulation water bath, supplying water from said booth circulation water bath into said condensation bath in an amount equal to an amount of said filtrate conveyed from said filtrate bath into said coating booth.

4. The method according to claim 1, wherein said recycling system further has a filtrate bath, and further comprising:
when spray-coating of an article is not being performed, conveying a necessary amount of said filtrate from said filtrate bath into said coating booth so as to clean an interior of said coating booth; then
performing a spray-coating operation in said coating booth; and then
supplying water into said condensation bath.

5. The method according to claim 4, wherein
supplying water into said condensation bath comprises supplying water into said condensation bath, prior to using said ultra-filtration apparatus to separate a mixture of over-spray paint and water into condensed paint and filtrate, in an amount equal to an amount of liquid lost during performance of the spray-coating operation.

6. The method according to claim 1, further comprising:
adjusting said condensed paint by adding thereto another aqueous paint and a volatile component so as to provide adjusted condensed paint, wherein said adjusted condensed paint is to be used as aqueous paint for spray-coating an article in said coating booth.

7. The method according to claim 1, wherein
controlling a total amount of liquid within said recycling system to be constant during the spray-coating of said article with said aqueous paint comprises, prior to evaporation of water from said booth circulation water bath, supplying water into said condensation bath in an amount equal to an amount of filtrate conveyed into said coating booth during a time period when spray-coating of said article is not being performed.

8. The method according to claim 1, wherein
controlling a total amount of liquid within said recycling system to be constant during the spray-coating of said article with said aqueous paint comprises supplying water into said condensation bath, prior to using said ultra-filtration apparatus to separate said mixture of over-spray paint and water into condensed paint and filtrate, in an amount equal to an amount of liquid lost during spray-coating of said article.

* * * * *